June 11, 1974  P. JUNOD  3,816,601
PROCESS FOR THE PRODUCTION OF PURE METAL HALIDES
Filed April 5, 1971
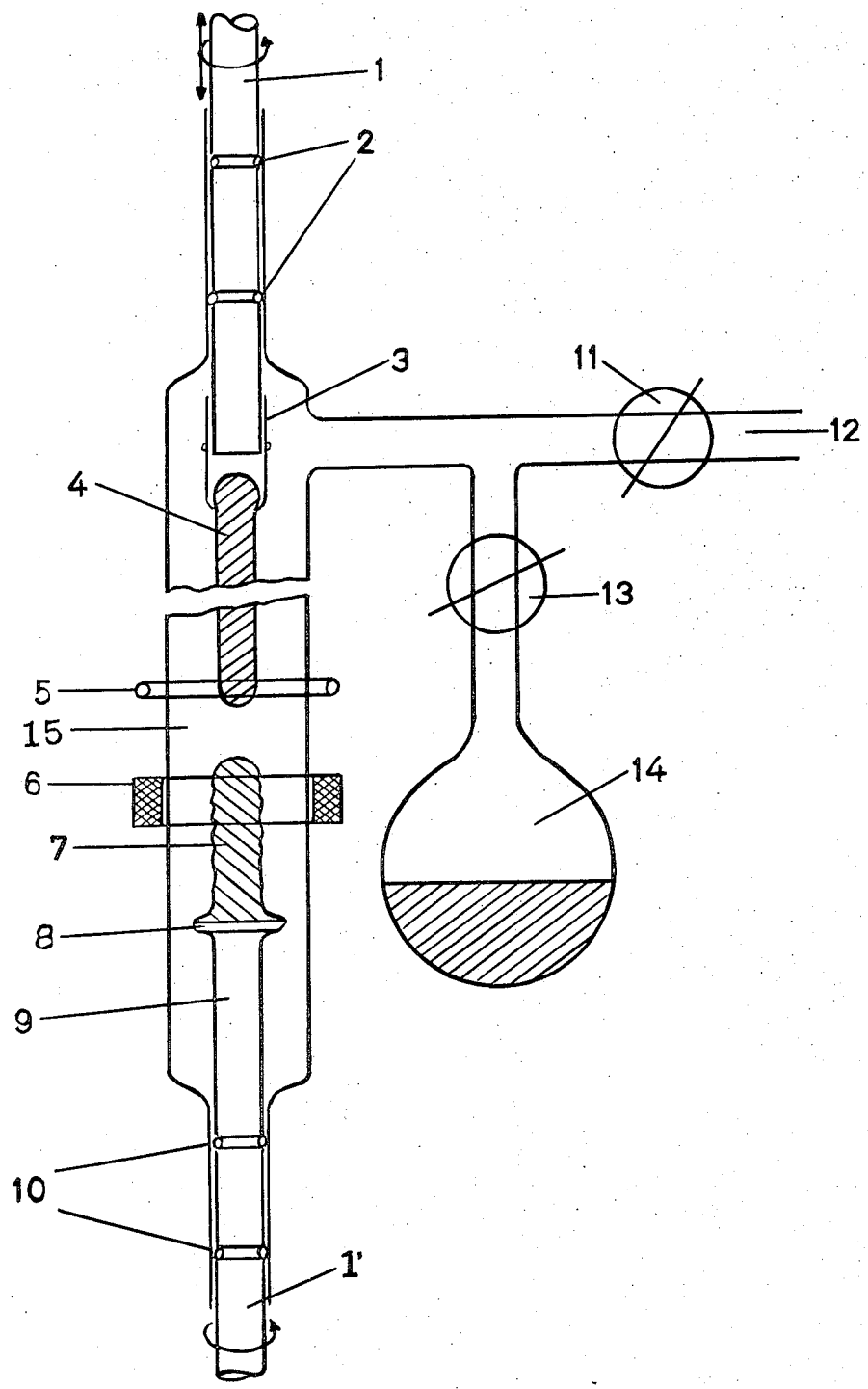

United States Patent Office 3,816,601
Patented June 11, 1974

3,816,601
PROCESS FOR THE PRODUCTION OF
PURE METAL HALIDES
Pierre Junod, Fribourg, Switzerland, assignor to
Ciba-Geigy AG, Basel, Switzerland
Filed Apr. 5, 1971, Ser. No. 131,006
Claims priority, application Switzerland, Apr. 6, 1970,
5,062/70
Int. Cl. B01j 17/32; C01b 9/00; C01g 5/00
U.S. Cl. 423—491
14 Claims

ABSTRACT OF THE DISCLOSURE

The process of this invention for the production of metal halides, especially silver halides, comprises reacting the metal with the vapour of the halogen in a closed vessel. A mono- or polycrystalline metal halide body is built up on a stationary or rotating base. Very pure metal halides are obtained.

---

The present invention relates to a process for the production of pure metal halides from the elements. The process is characterised in that pure metal is reacted in a closed reaction vessel, without crucible, with the vapour of a halogen at a temperature which is below the melting temperature of the metal and above the melting temperature of the halide; and the liquid or gaseous halide is allowed to build up on a stationary or rotating base, at a temperature below the melting temperature of the halide, to form a mono- or polycrystalline body.

The process according to the invention relates, in a preferred embodiment to the production of highly pure silver halides from the elements, whereby highly pure silver is used as the metal.

The procedure is known of obtaining metal halides by the reaction either of metal salts with hydrohalic acids or with alkali metal salts of these acids, or of the metals with the halogens.

Thus, for example, silver halides are produced by reaction of silver salts, especially silver nitrate, with hydrohalic acids or with the alkali metal salts thereof. Silver halide powders are obtained which have no particularly high degree of purity, since a proportion of the foreign ions present during the chemical reaction become incorporated into the reaction product, and cannot be completely removed from it. A further method is the direct reaction between silver and the halogen, particularly between silver and bromine, the silver being allowed to react at about 500° C. with bromine vapours. The reaction is mainly carried out in quartz vessels. Since the present state of technology does not permit a quartz to be produced which is completely free of water and metallic impurities, the liquid silver halide absorbs these impurities when it comes into contact with quartz vessels. The silver halides come likewise into contact with quartz material when they are purified by means of zone melting. Zone melting of silver halides, especially of silver chloride and silver bromide, is involved and mostly not very effective. In the case of silver bromide, it is necessary, because of the high expansion coefficients of this salt near the melting point, to use reinforced quartz tubes in order to be able to carry out zone melting. Also of disadvantage are the long zone melting times with only a slight purification effect, these times being due to the fact that the segregation coefficients of the main impurities, such as, e.g. $Fe^{3+}$, $Ni^{2+}$, $Li^+$, $Na^+$, $Cd^{++}$, Zn and $S^{2-}$, are near to 1.

In comparison, the present process renders possible the formation, without crucible, of pure metal halides, especially highly pure silver halides, in one operation from the metal to the crystalline halide. "Without crucible" thereby signifies that neither for synthesis of the halide nor for crystallisation is a crucible required, the possibility being thus avoided of impurities being taken up by the formed halides. The only exception is the lowest layer of the growing metal halide crystal, this layer being in contact with the foreign material of the base and thus able to take up impurities from this. This lowest layer is, however, subsequently discarded.

Further characteristics and details of the invention are given in the following description which serves to illustrate, with the aid of the attached drawing, examples of embodiments of the process according to the invention. This drawing shows schematically a cross section of a device by means of which the process according to the invention can be carried out.

The device comprises a tube-shaped reaction chamber 15, to which can be alternatively connected a vacuum-source 12 and a halogen-supply-vessel 14. In the reaction chamber 15 is located a holder or support 3 for the fixing (without crucible) of a metal rod, as well as, directly underneath in line of fall, a dish 8 for receiving crystals, this dish being positioned on a support 9. The holder 3 and the dish 8 are rotatable around the aligning axes 1 and 1'. These rotatable axes or stems 1 and 1' are provided with sealing rings 2 and 10 and are thus introduced into the reaction chamber through vapour-tight and vacuum-tight seals. The rotatable stems (axes) can be drawn out, together with the holder 3 and the dish 8, from the reaction chamber. With the two heating devices 5 and 6 are formed, within the reaction chamber, two temperature zones which can be controlled separately from each other. The heating device 5, e.g. a high-frequency coil, inductively heats the metal to a temperature sufficient to initiate a reaction with the halogen. The heating device 6, e.g. a radiation furnace, is so controlled that the solidification conditions for the metal halide render possible the formation of mono- or polycrystalline material. The regulators for the two heating devices 5 and 6 are not shown in the drawing. The reaction chamber is evacuated, before commencement of the reaction, via a vacuum tube 12, which can be closed with a vacuum-tap 11.

The flow of halogen gas required for the reaction is passed, by opening of the vacuum-tap 13, from the halogen-supply vessel 14 into the reaction apparatus. If the inherent vapour pressure of the halogens at room temperature is too high or too low to establish in the reaction vessel the halogen concentration suitable for the reaction with the metal, then the halogen-supply-vessel 14 is correspondingly cooled or heated by means of a cooling or heating device not shown in the drawing.

In addition to the dish or plate 8, it is possible also for the metal rod fixed in the holder 3 to act as a stationary or rotating base or support for the formation of the metal halide, this being particularly so in the preparation of those metal halides which possess, at temperatures below the melting point of the halide, such a high vapour pressure that the single crystals can be formed direct from the gas phase.

Used as starting materials for the production of metal halides for the present process are pure metals, e.g. superpure, zone-melted silver, as well as halogens purified by known methods. Thus, for example, chlorine can be purified and dried with concentrated sulphuric acid and phosphorus pentoxide, whilst bromine can be distilled over sulphuric acid and iodine sublimated. For carrying out the process according to the invention with the described apparatus, the procedure is as follows: In the reaction apparatus, a metal rod or bar is suspended (without crucible) in the rotatable holder 3 provided for this purpose (⅓–1 rotation per sec. during the reaction); the apparatus is then degassed via the vacuum tube 12 at a pressure of $10^{-5}$ to $10^{-7}$ torr. The diameter of the metal rod can vary within wide limits but, in order to ensure a continuous drop formation of the formed metal halide, especially silver halide, the diameter should not exceed the order of size of 10 centimetres. In the case of single-crystal formation, the diameter of the metal rod should be, as far as possible, below 1 cm.

By means of the heating device 5, which is preferably high-frequency heating, the metal is then heated to temperatures in the region of about 400 to 1100°, preferably 500 to 1000° C. For the reaction of silver with the halogens, temperatures of 450 to 700° C., preferably 500 to 600° C., have proved favourable. In fixing the reaction temperature within the stated ranges, a further point to observe is that this temperature should always be above the melting temperature of the forming halide. The high-vacuum-tap 13, which connects the halogen-supply vessel 14 to the reaction apparatus, is opened so that a halogen atmosphere can form in the reaction apparatus. The halogen vapour pressure necessary for the reaction with the metals amounts to, depending on the metal, 1 to 500 torr. In the case of a reaction with silver, the halogen vapour pressure should be 100 to 500 torr, preferably 100 to 300 torr. In the production of silver bromide, a bromine vapour pessure suitable for the reaction is obtained already at room temperature. The inherent vapour pressure of the bromine at this temperature is 200 torr. The vapour pressure of chlorine at this temperature is appreciably higher, so that it is necessary to correspondingly cool the halogen-supply vessel (Dry Ice/methanol or Dry Ice/acetone cooling baths), in order to maintain the formation of halide within controllable limits. In the case of the production of silver iodide, the inherent vapour pressure of the iodine is adjusted, by slight heating, to the value suitable for the reaction.

The liquid metal halide formed during the reaction drips down from the metal rod onto a preferably rotating ceramic, or preferably quartz dish 8, which is rotating at a velocity of about ⅓ to 1 rotation per second. The first drops solidify on the base and form a metal halide bottom layer. As the next drops land, a thin layer becomes melted onto the surface of the solid metal halide, this phenomenon being due to the thermal energy and the heat of fusion of the liquid halide. These solidification conditions, initially not greatly controlled, can be appreciably improved with the aid of the heating device 6, which is preferably a radiation furnace. The temperature of this furnace is below the melting temperature of the halide, preferably 30 to 70° C. below this temperature, and is so adjusted that the surface tension of the molten halide suffices to mechanically stabilise the molten tip. These directional and controlled solidification conditions are very favourable for the stress-free formation (without crucible) of pure metal halide crystals of mono- or polycrystalline character. The growth velocity of the metal halide bodies is very varied, e.g. for silver halide bodies it is in the case of single crystal formation several mm./hour, but the growth velocity in the production of polycrystalline material can amount to several cm./hr. By application of the described process it is possible to carry out, in one operation, the synthesis of pure metal halides, especially of superpure silver halides, from the elements, as well as to obtain the formation of crystalline material, particularly of single crystals. Applied to the production of silver iodide, the described process does not lead to single crystals on account of the crystallographic phase transformations of the silver iodide on cooling.

The fact that pure metal halides, particularly silver halides, are obtained by the process can be proved by measurements of the electrical conductivity, or by mass spectrometry.

The metal halides, especially silver halides, produced according to the invention are used, e.g. in the optical industry (bubble-free single crystals), or for photographic purposes, such as, e.g. for the production of thin, binder-free, light-sensitive photographic layers by means of vapour deposition. If the silver halides are to be used for the production of light-sensitive photographic material, then the silver halides have to be sensitized, since, on account of their high degree of purity, they have negligible light-sensitivity. In the production of photographic material, this additional operation is accepted, since the material can be dosed to any desired degree at will and can also be produced in reproducible qualities. The slight, but nevertheless existing light-sensitivity necessitates operating for the production of silver chloride preferably with a yellow light, and for the production of silver bromide preferably with a red light, if the produced silver halides are to be used for purposes whereby a daylight-induced silver nuclei formation has to be avoided, such as, e.g. in the case of the use of the silver halides in photographic materials.

The process according to the invention is suitable for the production of halides of metals of the IV to VI subgroup of the periodic system of the elements or of the rare earth metals. Representative elements of these groups are: chromium, molybdenum, niobium, tantalum, titanium, zirconium, and lanthanum.

The method according to the invention is always applicable where the reaction between a high-melting solid phase (metal) and a gaseous phase (halogen) produces a definite compound. The melting point of the compound must, of course, be lower than that of the solid initial phase.

EXAMPLE 1

As starting materials are used zone-melted, highly pure silver and distilled and degassed bromine. A silver rod of 4 to 8 mm. diameter is secured in the reaction apparatus, without a crucible, by means of a quartz holder 3. The bromine-supply flask, closed by a vacuum tap 13, is attached to the apparatus. The apparatus is evacuated to give a vacuum of $10^{-6}$ torr, and degassed by heating with a gas flame. The vacuum tube 11 is closed and the apparatus 15 filled with bromine vapour by opening of the bromine-supply flask 14, so that the pressure in the apparatus is about 200 torr. The high frequency heating device 5 for heating the silver and the radiation furnace 6 for control of the solidification conditions of the formed silver bromide, are then switched on. With the aid of regulators, a temperature of 600° C. is established for the high frequency heating, and a temperature of 400° C. for the radiation furnace. The melting point of the silver bromide is 430° C. The operation is performed in a red light.

The chemical reaction commences, and liquid silver bromide drips down onto the rotating quartz dish 8. After a starting period of 10 minutes, the rotating silver rod assumes a conical form; thus is obtained a constant drop size and dropping velocity. The height of fall of the drops is 3 cm. The growth velocity of the silver bromide crystal is 5 to 8 mm./hour. By control of the temperatures of the high frequency heating device 5 and of the radiation furnace 6, as well as of the feed rate of the silver rod, a silver bromide single crystal 7 is obtained of the desired diameter. The rate of rotation of the silver rod 4 and of the quartz dish 8 is approximately 1 revolution per second.

EXAMPLE 2

For the production of highly pure silver chloride, the procedure is used as described in Example 1, but here chlorine is used instead of bromine, the chlorine-supply flask 14 being cooled with an alcohol/solid carbon dioxide mixture to −60° C. (vapour pressure of $Cl_2$=ca. 200 torr), the temperature of the radiation furnace adjusted to 420° C., and the process carried out in a yellow light. A highly pure silver chloride single crystal is obtained.

EXAMPLE 3

The procedure as described in Example 1 is applied, but in this case iodine is used, the iodine-supply flask 14 being heated to 70° C. (vapour pressure of $J_2$=10 torr), the whole apparatus heated by means of a heating band (not shown in FIG. 1) to 70° C. to avoid condensation of the iodine on the cold areas, and the high frequency heating device 5 so adjusted that the temperature of the silver rod is 650° C. By this means is obtained, after cooling, a silver iodine crystal of polycrystalline structure.

EXAMPLE 4

The procedure for the production of copper halides is the same as that described in Example 1, but the temperatures of the high frequency heating device 5 and those of the radiation furnace 6 are modified according to the following table:

| Cu-halide | Temperatures in ° C. in the heating device | |
|---|---|---|
| | 5 | 6 |
| Cl | 600 | 400 |
| Br | 600 | 400 |
| J | 700 | 560 |

After cooling is obtained pure copper halide crystals of polycrystalline structure.

EXAMPLE 5

If gadolinium is used as the metal and bromine as halogen, the high frequency heating device 5 being so adjusted that the temperature of the gadolinium rod is 650° C., the radiation furnace 6 heated to 700° C., and the bromine-supply flask cooled with an alcohol/solid carbon dioxide mixture to −60° C. (vapour pressure of $Br_2$<1 torr), the procedure being otherwise as in Example 1, then a pure gadolinium bromide crystal is obtained.

In a similar manner are obtained the bromides of neodymium, terbium, dysposium, holmium, and erbium.

EXAMPLE 6

The procedure is used as described in Example 1, but chromium is used as the metal and bromine as halogen, the high frequency heating device 5 being so adjusted that, in a bromine atmosphere of 200 torr, the temperature of the chromium rod is 1000° C. On the colder zones of the chromium rod (ca. 800° C.) are formed well developed lamellar chromium-(III)-bromide crystals.

I claim:

1. A process for the production of a pure metal halide of metals selected from the group I B and IV B to VI B of the periodic table and the lanthanide series which comprises reacting the substantially pure metal inside a closed reaction vessel with the vapour of chlorine, bromine or iodine, said metal being so positioned that neither the metal nor the newly formed halide comes into contact with the walls of the reaction vessel, at a temperature below the melting temperature of the metal and above the melting temperature of the halide, and collecting the metal halide thus formed in a dish on a stationary or rotating base formed under conditions so adjusted and controlled, that the metal halide is recovered in crystalline form.

2. Process according to claim 1, in which the reaction temperature is 450 to 1100° C.

3. Process according to claim 2, in which the reaction temperature is 500 to 1000° C.

4. Process according to claim 1, in which the metal is substantially pure silver.

5. Process according to claim 4, in which the silver is reacted at a temperature of 400 to 700° C.

6. Process according to claim 4, in which zone-melted silver rods are used.

7. Process according to claim 1, in which the halogen vapour pressure in the reaction vessel is 1 to 500 torr.

8. Process according to claim 7, in which the halogen vapour pressure is 100 to 300 torr.

9. Process according to claim 1, in which the halogen vapour pressure necessary for the reaction is produced corresponding to the inherent vapour pressure of the halogens at room temperature, by cooling or heating of the halogens.

10. Process according to claim 1, in which the formed liquid halide drips down onto a flat quartz dish, and builds up there in crystalline form.

11. Process according to claim 1 for the production of silver chloride crystals and silver bromide crystals.

12. Process according to claim 1 for the production of polycrystalline silver iodide.

13. A process according to claim 1, in which the crystallization step is controlled in such a manner that the halide is recovered in monocrystalline form.

14. A process according to claim 1, in which the crystallization step is controlled in such a manner, that the halide is recovered in polycrystalline form.

References Cited

UNITED STATES PATENTS

| 2,686,864 | 8/1954 | Wroughton et al. | 23—273 SP |
| 2,946,668 | 7/1960 | Riohelsen | 423—491 X |
| 3,147,073 | 9/1964 | Brown | 23—87 R |
| 3,240,568 | 3/1966 | Derby et al. | 23—301 SP |
| 3,297,464 | 1/1967 | Wilferth | 23—87 X |

OTHER REFERENCES

Brauer, "Handbook of Preparative Inorganic Chemistry," 2nd edition, 1965, vol. II, pp. 1495–1497.

Lawson et al., "Preparation of Single Crystals," 1958, pp. 29–30.

RMIC Bulletin, Oak Ridge National Laboratory, ORNL-RMIC-2, pp. 17 and 18.

MILTON WEISSMAN, Primary Examiner

U.S. Cl. X.R.

423—492, 493; 23—301